3,842,014
GRAPHITE PELLETS

Gordon Charles Friend, Richmond, Charles John Geach, Shepperton, and Aleksander Jerzy Groszek, London, England, assignors to The British Petroleum Company, Limited, London, England
No Drawing. Filed Sept. 18, 1972, Ser. No. 289,835
Claims priority, application Great Britain, Sept. 28, 1971, 45,046/71
Int. Cl. C10g 25/00
U.S. Cl. 252—447  3 Claims

ABSTRACT OF THE DISCLOSURE

Graphite/alumina pellets formed from vacuum or gas ground graphite and alumina of pseudoboehmite structure, by mixing with water extruding and sintering, which are useful as selective adsorbents for normal paraffins e.g. in de-waxing waxy raffinates, are less corrosive to metals than pellets made from other types of alumina.

---

This invention is a modification of the invention described and claimed in U.S. application Ser. No. 98,029.

U.S. appln. Ser. No. 98,029 claims a composition of matter comprising graphite in the form of pellets with a binder, comprising finely divided alumina said graphite being a vacuum or gas ground graphite having a surface area of 50 to 2000 m.$^2$/gm. (BET).

U.S. appln. Ser. No. 98,029 also claims a process for the preparation of graphite-containing pellets which process comprises intimately mixing a vacuum or gas-ground graphite powder having a surface area of 50 to 2000 m.$^2$/gm. with a finely divided alumina binder, working the mixture into a paste with a suitable liquid and granulating or extruding through a die and a process for the separation of normal hydrocarbons and/or polar compounds from their mixture with other hydrocarbons which comprises contacting the mixture with graphite pellets as herein before defined to selectively absorb said normal hydrocarbons and/or polar compounds.

However it has been found that the aluminas used to form the pellets, can be corrosive especially in the wet state to metals such as iron, steel, aluminium and nickel which causes difficulty in the manufacture and use of the pellets.

We have discovered an alumina which can be used to form the pellets which is substantially non-corrosive.

According to the invention there is provided a composition of matter comprising graphite, in the form of pellets with a binder comprising an alumina of surface area of at least 200 m.$^2$/grm. and having a pseudoboehmite structure of crystallite size less than 10 nanometres, said graphite being a vacuum or gas ground graphite having a surface area of 50–2000 m.$^2$/grm.

According to another aspect of the invention there is provided a process for the preparation of graphite containing pellets which process comprising intimately mixing a vacuum or gas ground graphite powder having a surface area of 50 to 2000 m.$^2$/grm. with an alumina of surface area of at least 200 m.$^2$/grm. and having a pseudoboehmite structure of crystallite size less than 10 nanometres, working the mixture into a paste with a liquid and granulating or extruding through a die.

Preferably the liquid is water.

The pseudoboehmite structure of aluminas is described as $Al_2O_3 \cdot xH_2O$ where $x > 1$. The value of $x$ is variable and depends on the ageing of the salt.

The graphite and the alumina can be mixed either wet or dry. In dry mixing satisfactory results have been obtained by ball milling but high speed mixing in e.g. a Universal High Speed Mixer Type TLEHK–8 made by Gunter Papenmeier A.G. is preferred. In wet mixing it is preferred to mix using a High Speed Mixer or a colloid mill e.g. a colloid mill made by Premier Colloid Mills Ltd. using a gap of $1.016 \times 10^{-4}$ m. between the stones. The granulation can be effected by spreading the paste out on a tray, allowing to dry and breaking up the cake so formed.

After extrusion or granulation the extrudate or granules are preferably dried, broken up and sintered in nitrogen for 24 hours at 400° C.

The extruded pellets thus prepared are mechanically strong and stable in hydrocarbon solvents such as toluene, $n$-heptane and iso-octane, and are also stable in polar solvents, in steam and boiling water.

The graphite used to prepare the pellets is preferably ground graphite prepared by ball milling graphite in vacuum or gas e.g. air.

The grinding of the graphite gives small particles with a plate like graphite structure. Most of the surface area is contributed by the basal planes of the plates, but there is also a significant contribution made by the edges. For air ground graphite the ratio of basal plane surface area to edge surface area in a typical instance is about 4.5:1.

The graphites thus produced have the capability of absorbing normal hydrocarbons on the basal plane surface area and polar compounds, e.g. aromatics, sulphur and nitrogen compounds on the edge surface area. By adjustment of the feedstock and process conditions as described hereunder, the selectivity for either type of compound can be varied.

The graphites before compounding with the binder preferably have a surface area of at least 50 square metres per gram and more preferably have a surface area of at least 300 square metres per gram.

Preferably the amount of graphite in the graphite/alumina pellets is from 50–80% wt.

Preferably the amount of alumina in the graphite/alumina pellets is from 6–50%.

The preferred weight ratios of graphite to alumina are from 1:1 to 9:1.

The invention also provides a process for the separation of normal hydrocarbons and/or polar compounds from their mixtures with other hydrocarbons comprising contacting the mixture with graphite pellets as hereinbefore defined to selectively adsorb said normal hydrocarbons and/or polar compounds.

The feed mixture for the process can be a petroleum distillate or residue boiling above 300° C. particularly a fraction in the waxy distillate boiling range i.e. 300 to 700° C. or a waxy raffinate or a dewaxed raffinate. The feed may be a straight run fraction or a waxy raffinate obtained after a selective solvent treatment with e.g. furfural to remove aromatics. The feed can also be a solvent treated dewaxed lubrication oil fraction or gas oil and higher boiling hydrogenated or hydrocracked waxy distillates. The treatment can be limited to a finishing treatment to improve colour and oxidation stability.

The absorption and desorption stages of the process of the invention are preferably carried out in the presence of liquids in which the adsorbed and subsequently desorbed components are soluble. These liquids may be the same or different. Thus, the liquid may comprise a single paraffin hydrocarbon, such as $n$-heptane or $iso$-octane, or it may comprise a mixture of hydrocarbons including refinery streams such as Primary Flash Distillate or an aromatic or alcoholic solvent may be used. The solvent used for dewaxing is preferably a polar solvent since such solvent promotes the absorption of nonpolar compounds, such as waxes, including long chain $n$-paraffins. For the removal of polar compounds, the preferred solvent is a polar or aromatic solvent.

The adsorption stage of the process of the invention may be performed at a temperature of from −50° C. to 200° C. If a mixture of paraffins, aromatics or alcohols is used its boiling range should be within this range. Hydrocarbons whose atmospheric boiling point is outside this range may be used at sufficient pressure to achieve a boiling point within the range quoted, provided that the desorption temperature is not above the critical temperature. Thus, for example, liquified propane and butane (L.P.G.) may be used under certain conditions.

For processing waxy raffinates and distillates a solvent is preferred. For a mobile liquid feedstock such as gas oil or kerosene no solvent is required.

The loading of the graphite with the absorbed components will depend on the nature of the feed, preferably it is less than 1:1, and more preferably less than 1:2 wt. The ratio of absorbed components to graphite may, however be as low as 1:100. When refining waxy raffinates or distillates with dewaxing as the prime objective the overall graphite:feed ratios preferably are in the range 0.5:1 to 10:1. If a multistage batch treatment is being used the individual stage graphite:feed ratios may be in the range 0.5:1 to 4:1.

When treating a dewaxed raffinate with the object of removing aromatics, heterocyclics, sulphur compounds and coloured materials, the overall graphite:feed ratios is preferably in the range 0.5:1 to 10:1.

When applying a process to improve the heat and colour stability of a gas oil, lubricating oil or a hydrocracked gas oil the graphite:feed ratio is preferably 0.01:1 to 1:1.

The feed solvent/feed ratios can be up to 50:1 by wt. Suitable contact times between the graphite and the feed may be from 1 minute to 24 hours. The adsorption of n-paraffins is promoted by low temperatures within the stated range, and the preferential adsorption of aromatics by higher temperatures. Thus, the temperature should preferably not be above 100° C. and more preferably is from 0 to 50° C. if it is desired to adsorb paraffins. The temperature is preferably above 30° C., and more preferably is from 50 to 200° C., where aromatics are to be adsorbed.

The adsorbed hydrocarbons may be recovered from the graphite by contacting it with a liquid which can optionally by the same as that of the adsorption stage, or a chemically identical or different liquid may be used. The use of the same solvent is preferred.

The temperature can be in the range from room temperature up to 1000° C. and pressure can be applied if necessary to keep the material treated in the liquid phase. Typically the temperature of desorption is in the range of 100–400° C.

Alternatively, certain feedstocks can be treated over the graphite alumina adsorbent in the gas phase.

The pressure at which desorption is carried out should be such as to maintain the eluting material in the liquid state and will accordingly be within the range 10 to 3000 p.s.i.g. It will of course be determined by the vapour pressure of the eluting material at the desorption temperature. The contact time will be within the range 1 to 120 minutes. The solvent/desorbate ratio is preferably from 2:1 to 100:1.

The method can desirably be carried out in a cyclic type of operation, for example, by percolating the feed mixture together with liquid through a bed of graphite pellets, removing non-adsorbed feed material, and liquid from the bed stripping the liquid from the non-adsorbed feed material, desorbing the adsorbed material from the graphite with the liquid, removing the desorbed material and liquid from the bed, stripping liquid from the desorbed material, and re-contacting the graphite with the feed mixture. In such a fixed bed type the operation reaction conditions, in particular liquid flow rate, should be chosen so that the pressure drop across the bed is not excessive.

In the case of preparation of lubricating oil base-stocks, the feedstock can be treated by any number of adsorption/desorption cycles to give a desired pour-point and viscosity index. The pour point of the treated material will decrease as the extent of removal of adsorbed materials increases, but the yield will also decrease. Waxy raffinate fractions treated by the process of the invention have in general higher viscosity indexes, lower cloud and pour points and lower sulphur contents than fractions obtained by conventionally treating similar feedstocks. They also have better response to oxidation inhibitors. In addition to the oil products obtained, the adsorbed and subsequently desorbed material i.e. normal paraffins and/or aromatics may be of use, particularly if it is waxy paraffinic or aromatic hydrocarbon material.

The invention is illustrated by the following examples.

EXAMPLE 1

An alumina powder having an average crystallite size of 7.7 nm. of pseudoboehmite structure and surface area 275 m.$^2$/gm. measured by nitrogen adsorption using the BET method, sold by Pechiney St. Gobain grade GB 100, was rolled dry with 3 times its weight of a graphite powder produced by ball milling graphite in air to a surface area of 325 m.$^2$/grm.

The mixture was then worked into a thick paste by adding water and extruded through a $3.175 \times 10^{-3}$ m. die. The extrudate was dried in air, broken up into pellets of ⅛" diameter and sintered in nitrogen for 24 hours at 400° C. to yield pellets of size ⅛" diameter. These pellets are referred to as $A_1$ pellets.

The process was repeated using a grade of alumina the same as the one used above except that the crystallite size was an average of 3.1 nm., these pellets are referred to as $A_2$ pellets.

These graphite/alumina pellets were then used to dewax petroleum fraction as in the following Examples 2 and 3.

EXAMPLE 2

A finished Middle East lubricating waxy raffinate having a viscosity of 110 centistokes at 100° F. and a viscosity index of 95 determined by test method ASTM D–2270 was percolated through crushed alumina pellets of size British sieve 25–100 prepared as above, at ambient temperature using a variety of elements. The loading graphite:oil was 4:1.

The pour point of the untreated oil was 44 C. (micro).

The adsorbed material was eluted using a solvent, and the results are shown in Table 1 below:

| Pellets | Eluent | Yield (percent wt.), ±5% | Pour point (° C.), ±5° C. |
|---|---|---|---|
| $A_1$ | Iso-octane | 61 | −28 |
| $A_2$ | do | 55 | −25 |
| $A_1$ | Ethylene dichloride | 65 | −15 |
| $A_2$ | do | 63 | −34 |

EXAMPLE 3

Example 1 was repeated using a Middle East waxy raffinate of pour point 10° C.

The results are shown in Table 2 below:

| Pellets | Eluent | Yield (percent wt.), ±5% | Pour point (° C.), ±5° C. |
|---|---|---|---|
| $A_1$ | Iso-octane | 60 | −9 |
| $A_2$ | do | 60 | −12 |

EXAMPLE 4

The paste of graphite/alumina and water prepared as in Example 1 was placed in a steel tray and dried, no corrosion of the steel was seen. This was repeated using identical pellets made from (i) a colloidal alumina of surface area 350 m.$^2$/grm. in the form of microcrystalline fibrous boehmite of which was α-alumina monohydrate of fibril length 200 to 600 nanometres; (ii) a colloidal alumina of surface area of less than 2.0 m.$^2$/grm. of amorphous structure.

With both these aluminas (i) and (ii) severe corrosion of the steel tray was noted.

Thus the pellets according to the invention were much less corrosive than the other pellets.

We claim:

1. Graphite/alumina pellets consisting essentially of a gas or vacuum ground graphite of surface area 50–2000 square metres per gram, and, as a binder, alumina of pseudoboehmite structure of crystalline size less than 10 nanometres and of surface area 200–600 square metres per gram.

2. Graphite/alumina pellets as claimed in claim 1 in which the said grahpite/alumina pellets have a particle size 4–200 British Standard Seive mesh.

3. Graphite-alumina pellets as claimed in claim 1 in which the weight ratio of graphite:alumina is from 1:1 to 9:1.

References Cited
UNITED STATES PATENTS

| | | | |
|---|---|---|---|
| 3,205,179 | 9/1965 | Soderquist et al. | 252—447 |
| 2,628,933 | 2/1953 | Eagle et al. | 208—310 |
| 3,338,815 | 8/1967 | Gloszek | 208—310 X |

OTHER REFERENCES

Newsome et al.: Technical Paper No. 10, Second Review, "Alumina Properties" (1960), Alcoa Research Laboratories, Pittsburgh, Pa., p. 63.

PATRICK P. GARVIN, Primary Examiner

U.S. Cl. X.R.

208—310